United States Patent
Chen et al.

(10) Patent No.: US 10,361,905 B2
(45) Date of Patent: *Jul. 23, 2019

(54) ALERT REMEDIATION AUTOMATION

(71) Applicant: INTERNATIONAL BUSINESS MACHINES CORPORATION, Armonk, NY (US)

(72) Inventors: Hao Chen, Beijing (CN); Ya Bin Dang, Beijing (CN); Shao Chun Li, Beijing (CN); Guang Tai Liang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 14/930,758

(22) Filed: Nov. 3, 2015

(65) Prior Publication Data
US 2017/0126523 A1   May 4, 2017

(51) Int. Cl.
*H04L 12/24*   (2006.01)

(52) U.S. Cl.
CPC ........ *H04L 41/0613* (2013.01); *H04L 41/069* (2013.01); *H04L 41/0654* (2013.01); *H04L 41/0681* (2013.01); *H04L 41/5009* (2013.01); *H04L 41/5019* (2013.01)

(58) Field of Classification Search
CPC ..................................................... H04L 43/08
USPC ........................................................ 709/224
See application file for complete search history.

(56) References Cited

U.S. PATENT DOCUMENTS

| 8,875,129 | B2 | 10/2014 | Wagner et al. | |
| 9,027,125 | B2 | 5/2015 | Kumar et al. | |
| 2008/0256593 | A1* | 10/2008 | Vinberg | G06Q 10/06 |
| | | | | 726/1 |
| 2009/0271232 | A1* | 10/2009 | Waguet | G06Q 10/06 |
| | | | | 705/7.36 |

(Continued)

OTHER PUBLICATIONS

Hao Chen et al., "Alert Remediation Automation", U.S. Appl. No. 14/954,573, filed Nov. 30, 2015.

(Continued)

*Primary Examiner* — Kevin T Bates
*Assistant Examiner* — Emad Siddiqi
(74) *Attorney, Agent, or Firm* — Cantor Colburn LLP; Grant Johnson (57) ABSTRACT

Technical solutions to automate alert remediation are described. One aspect includes a method that includes receiving a plurality of alerts from an application monitoring system, the plurality of alerts associated with a plurality of remediation procedures respectively. The method also includes selecting a subset of alerts from the plurality of alerts. The method also includes identifying a subset of remediation procedures corresponding to the subset of alerts and analyzing compliance, with a service level agreement, of an execution of the entire subset of remediation procedures. In response to the execution of the entire subset of remediation procedures being non-compliant, the latest alert that was added, is removed from the subset of alerts, and a remediation procedure corresponding to the latest alert is removed from the subset of remediation procedures. The method includes executing the entire subset of remediation procedures.

8 Claims, 3 Drawing Sheets

(56) References Cited

U.S. PATENT DOCUMENTS

| | | | | |
|---|---|---|---|---|
| 2012/0116836 A1* | 5/2012 | Flores | ................ | G06Q 10/0633 |
| | | | | 705/7.27 |
| 2014/0310401 A1* | 10/2014 | Thomas | .................... | G06F 9/50 |
| | | | | 709/224 |
| 2015/0058477 A1* | 2/2015 | Gould | ................. | H04L 41/5012 |
| | | | | 709/224 |
| 2016/0359908 A1* | 12/2016 | Lam | ........................ | H04L 63/20 |

OTHER PUBLICATIONS

List of IBM Patents or Patent Applications Treated as Related; (Appendix P), Filed Jan. 29, 2016; 2 pages.
RSA Security Analytics Information Center, "Incident Management Process", pp. 1-2.

* cited by examiner

ALERT REMEDIATION AUTOMATION

BACKGROUND

The present application relates to alert remediation, and more specifically, to automate consolidation of alert remediation.

An application monitoring system generates alerts in response to events, such as errors, user requests for enhancements, or other such causes that trigger an alert. An alert may be categorized according to a hierarchy, such as a Level-1 alert, a Level-2 alert, a Level-3 alert, and so on, depending on a hierarchy chosen by an organization that handles and responds to the alert according to a remediation procedure associated with the alert. Depending on the categorization, different members of staff at the organization may handle the alert. Automating the remediation of the alert helps increase productivity of the staff handling the remediation procedures of the alert.

SUMMARY

According to an embodiment, a method for automated alert remediation includes receiving a plurality of alerts from an application monitoring system, the plurality of alerts associated with a plurality of remediation procedures respectively. The method also includes selecting a subset of alerts from the plurality of alerts. The method also includes identifying a subset of remediation procedures corresponding to the subset of alerts. The method also includes analyzing compliance, with a service level agreement, of an execution of the entire subset of remediation procedures. The method also includes, in response to the execution of the entire subset of remediation procedures being non-compliant, removing the latest added alert from the subset of alerts, removing, from the subset of remediation procedures, a remediation procedure corresponding to the first alert, and executing the entire subset of remediation procedures.

According to an embodiment, a system for automated remediation of alerts includes a communication interface to access a plurality of alerts generated by an application monitoring system. The system also includes a processor for execution of one or more remediation procedures in response to the plurality of alerts. The processor selects a subset of alerts from the plurality of alerts. The processor selects a subset of remediation procedures corresponding to the subset of alerts. The processor determines compliance, with a service level agreement, of an execution of the entire subset of remediation procedures. The processor, in response to the execution of the entire subset of remediation procedures being non-compliant, removes the latest added alert from the subset of alerts, removes, from the subset of remediation procedures, a remediation procedure corresponding to the first alert, and executes the entire subset of remediation procedures.

According to an embodiment, a computer program product for automated alert remediation includes computer readable storage medium. The computer readable storage medium includes computer executable instructions. The computer readable storage medium includes instructions to select a subset of alerts from a plurality of alerts generated by an application monitoring system. The computer readable storage medium includes instructions to select a subset of remediation procedures corresponding to the subset of alerts. The computer readable storage medium includes instructions to determine compliance, with a service level agreement, of an execution of the entire subset of remediation procedures. The computer readable storage medium includes instructions to, in response to the execution of the entire subset of remediation procedures being non-compliant, remove the latest alert from the subset of alerts; remove, from the subset of remediation procedures, a remediation procedure corresponding to the latest alert; and execute the entire subset of remediation procedures.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for automating remediation of alerts generated by an application monitoring system (AMS). The AMS monitors execution of one or more applications by a computer system, and generates alerts in response to occurrence of a predetermined condition during execution of the one or more applications. For example, the AMS generates an alert in response to occurrence of an error during execution of an application, such as an invalid memory access, a network error, response time being below a predetermined threshold, or any other errors. The AMS also monitors conditions of the computer system itself during the execution of the one or more applications and generates an alert on occurrence of conditions such as, a processor temperature increasing beyond a predetermined threshold, available storage level decreasing below a predetermined threshold, and other such conditions and a combination thereof.

Empirical data suggests that the among the alerts that an AMS generates, about 80% are categorized as those that are remediated according to standard remediation procedures, and the rest 20% are remediated by major enhancements or development work. Accordingly, automating the remediation of the majority of the alerts that are remediated using standard procedures can facilitate the organization to increase productivity of the staff handling the alerts by focusing on the development work.

The AMS generates alerts in a continuous manner. The alerts have different severity levels (Level-1, level-2 and so on). In addition, different alerts may be associated with distinct service level agreements (SLAs). Accordingly, remediation procedures for different alerts include multiple steps and execution conditions which lead to dependencies and conflicts among execution of remediation procedures of the alerts. Thus, a technical problem with automation of remediation procedures of multiple alerts that are the AMS continuously generates is to ensure compliance of execution of the remediation procedures of the alerts.

Accordingly, the technical solutions described herein navigate the compliance requirements, based on the SLAs, for the remediation procedures and consolidate execution of multiple remediation procedures, thus facilitating consolidation of execution of remediation procedures for multiple alerts to increase productivity of an organization.

Typically, organizations use an Alert-RP mapping to remediate an alert (RP=remediation procedures). The remediation procedure for an alert may include a series of actions specified by a standard operating procedure (SOP) for the particular alert, or type of alert. In organizations that rely on the Alert-RP mapping, an automated remediation system, upon receiving an alert, identifies the SOP corresponding to the alert based on the mapping, and executes the series of steps in the identified SOP. The automated remediation system in such cases, repeats this process upon receipt of a next alert. Such an automated remediation system is rigid, as the next alert cannot be processed until the previous alert has been processed. Further, the automated remediation system in this case ignores correlation of alerts, and further ignores overlap, dependency, and conflict among the SOPs for the alerts generated.

The technical solutions described herein overcome such inefficiencies, and improve efficiency and effectiveness of an automated remediation system by identifying relations between one or more alerts and consolidating the corresponding remediation procedures. Thus, the technical solutions do not process the generated alerts sequentially, one by one. The technical solutions, instead, use a variable length sliding time window (VLSTW) to maximize the remediation efficiency by processing a batch of alerts and minimize the remediation ineffectiveness by verifying cross-SOP compliance. Further yet, the technical solutions ensure compliance with constraints specified in SLAs.

Figure 1:
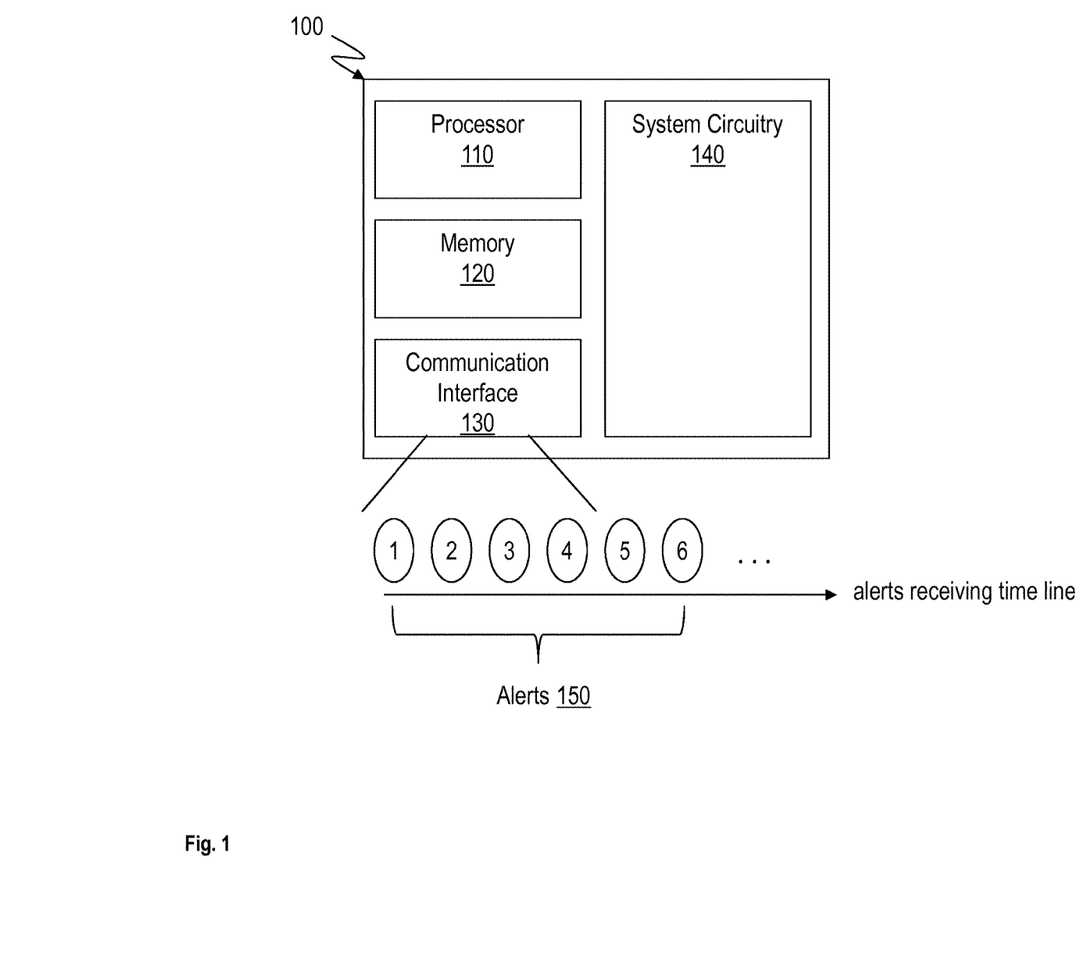
FIG. 1 illustrates an example automated alert remediation system in accordance with an embodiment.

FIG. 1 illustrates an example automated remediation system 100. The automated remediation system 100 includes, among other components, hardware such as a processor 110, a memory 120, a communication interface 130, and system circuitry 140.

The processor 110 may be a central processor of the automated remediation system responsible for execution of an operating system, control instructions, and applications installed on the automated remediation system 100. The processor 110 may be one or more devices operable to execute logic. The logic may include computer executable instructions or computer code embodied in the memory 120 or in other memory that when executed by the processor 110, cause the processor 110 to perform the features implemented by the logic. The computer code may include instructions executable with the processor 110. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 110 may be a general processor, central processing unit, server, application specific integrated circuit (ASIC), digital signal processor, field programmable gate array (FPGA), digital circuit, analog circuit, or combinations thereof. The processor 110 may be in communication with the memory 120, the communication interface 130, the system circuitry 140, and other components of the automated remediation system 100.

The memory 120 is non-transitory computer storage medium. The memory 120 may be DRAM, SRAM, Flash, or any other type of memory or a combination thereof. The memory 120 stores control instructions and applications executable by the processor 110. The memory 120 may contain other data such as images, videos, documents, spreadsheets, audio files, and other data that may be associated with operation of the system 100.

The communication interface 130 facilitates the automated remediation system 100 to receive and transmit data. For example, the communication interface 130 receives alerts 150 from the AMS, such as in the form of a computer network communication. The computer network communication may be wired or wireless. Alternatively or in addition, the communication interface 130 facilitates communication in other manners, such as via communication ports like Universal Serial Bus™ (USB), Ethernet, Thunderbolt™, or any other communication ports. The communication interface 130 further facilitates the automated remediation system 100 to transmit data, such as to execute the remediation procedures in response to the alerts. For example, the communication interface 130 facilitates communication with a display, audio system, and any other input/output peripheral. The alerts 150, in another example may be accessed by the communication interface 130, from a data repository, such as a remote computer or database system. For example, the AMS, upon generation of the alerts 150, stores the alerts 150 in the data repository and sends a communication to the automated remediation system 100 indicative of the availability of the alerts 150. In response, the automated remediation system 100, via the communication interface 130, accesses the alerts 150. The automated remediation system 100 receives and/or accesses the alerts 150 in an order in which they were generated. That is, the automated remediation system 100 accesses a first alert generated at t1 followed by a second alert generated at t2 followed by a third alert generated at t3 and so on, where t1, temporally occurs before t2, which in turn occurs before t3.

The system circuitry 140 includes hardware components that the processor 110 uses to execute the remediation procedures in response to the alerts. For example, the system circuitry 140 may include input/output peripherals such as keyboard and mouse. Alternatively or in addition, the system circuitry 140 includes human interaction components such as display and audio input/output circuitry. Alternatively or in addition, the system circuitry 140 includes computational devices such as graphics processing unit (GPU), arithmetic unit (AU),or any other co-processor.

Figure 2:
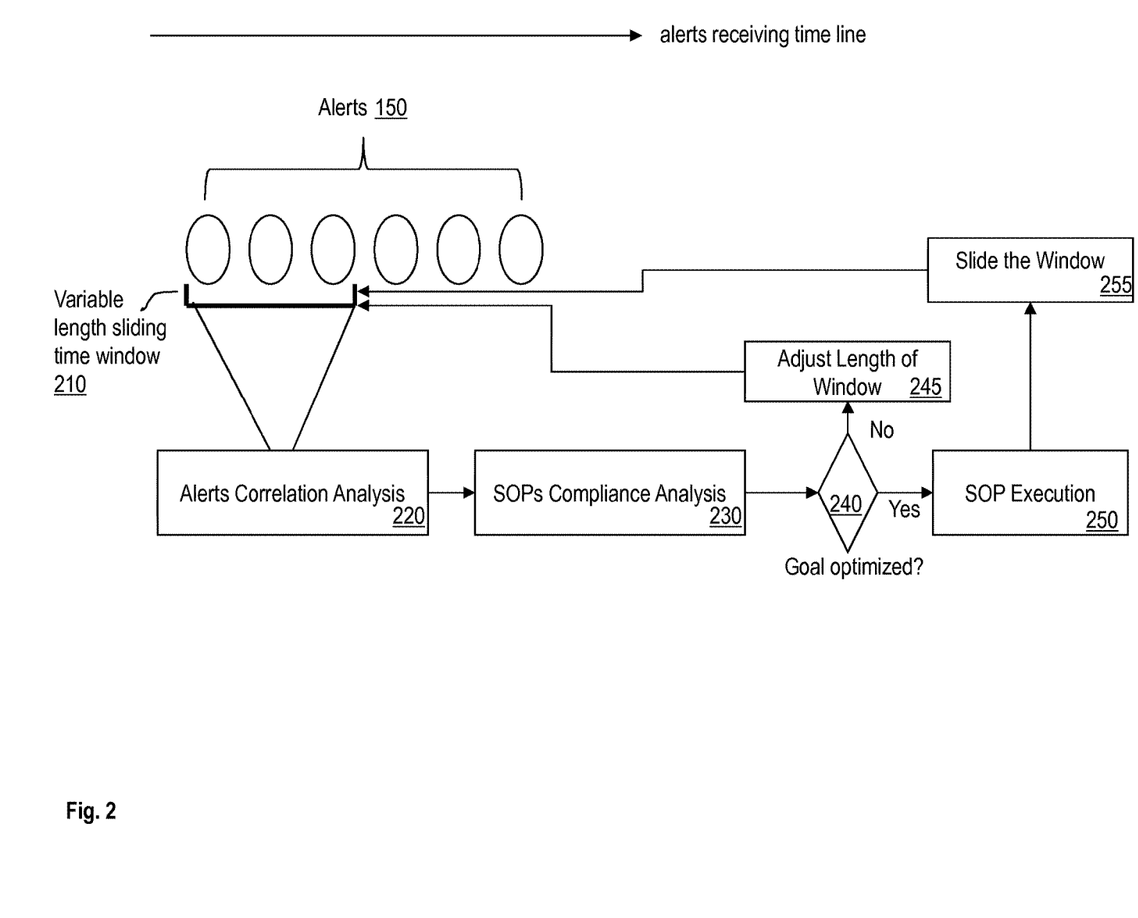
FIG. 2 illustrates a flowchart of automated alert remediation in accordance with an embodiment.

FIG. 2 illustrates a flowchart of an overall operation of the remediation automation system 100. The remediation automation system 100 analyzes a subset of alerts from the set of alerts 150. A variable length sliding time window 210 selects the subset of alerts analyzed. The processor 110 analyzes the selected subset of alerts to identify a subset of remediation procedures, as shown at block 220. The subset of remediation procedures includes SOPs corresponding to the selected alerts. The analysis further includes determining a correlation among the alerts in the selected subset. For example, the processor 110 identifies common characteristics of the alerts. For example, the characteristics of an alert may include an application for which the alert is generated, a type of the issue for which the alert is generated (such as processor related, storage related, user-interface related, or speed-related), a category of the alert (such as level-1, level-2). Alternatively or in addition, the processor 110 identifies relation among the alerts in the selected subset based on historical data. For example, the processor 110 groups two or more alerts that occur within a short time period. In another example, the processor 110 groups a pair of alerts in case a first alert occurs only after a second alert. In yet another example, the processor 110 groups one alert that is remediated after another alert has been remediated.

The processor further analyzes compliance of the remediation procedures in the subset of remediation procedures corresponding to the selected subset of alerts, as shown at block 230. For example, the processor 110 analyzes the characteristics and/or attributes of the remediation procedures in the subset, such as an estimated time to execute the remediation procedures. The processor 110, in addition, may determine an overlap in the actions included in the remediation procedures in the subset. For example, a first remediation procedure includes actions A, B, C, and D in response to the corresponding alert. In case a second remediation procedure includes actions E, B, and F, the processor 110 identifies that the first and second remediation procedures has a common action B, which may be consolidated. Accordingly, the processor 110 may reduce the time of execution by executing the first and second remediation procedures in conjunction, and thus improve the efficiency of the automated remediation. Further yet, the processor 110 may determine dependencies between the remediation procedures in the subset. For example, in the above first and second remediation procedures, if the action F depends on action B, the processor 110 determines the order of execution of the actions for the first and second remediation procedures such that F occurs after B.

The processor 120 further determines if any of the remediation procedures in the subset conflict with each other. For example, in the above example, if action D of the first remediation procedure is to shut down an application, and the action F is to input a particular value into the application, the first and second remediation procedures conflict with each other. Accordingly, the processor 110 may determine that the first and second remediation procedures are not compliant with each other, or in other words that the subset of remediation procedures is non-compliant. In case the remediation procedures are compliant the processor 110 merges the remediation procedures in the subset by consolidating the overlapping actions.

Alternatively or in addition, the processor 110 may determine a compliance of the subset of remediation procedures with respect to an SLA. For example, the processor 110 may estimate an execution time for the subset of remediation procedures. The processor 110 compares the estimated execution time with one or more constraints specified in an SLA, to ensure that the SLA constraints are being met.

The processor 110 adds an alert from the alerts 110 to the subset of alerts being analyzed by adjusting a length of the variable length sliding window 210 in case the current subset of alerts is not optimal, as shown at block 240 and 245. For example, if the estimated execution time of the current subset of remediation procedures is below the specified constraint in the SLA, the processor 110 concludes that additional alerts could be remedied. For example, consider that the current subset of alerts includes alert-1 and alert-2, and the corresponding subset of remediation procedures including RP-1 and RP-2 executes in 5 seconds. If the SLA constrains the remediation execution time to 10 seconds, the processor 110 attempts to increase the number of alerts that will be remedied in the variable length sliding time window 210, by analyzing a subset of alerts including an alert-3 in addition to the alerts alert-1 and alert-2. The processor 110, in this way, attempts to optimize the goal, by meeting the constraint in the SLA as closely as possible, as shown at block 240.

Alternatively, if the current subset of alerts is optimal, the processor 110 executes the entire subset of remediation procedures corresponding to the current subset of alerts, as shown at block 240 and 250. The processor 110, during execution of the remediation procedures, consolidates the overlapping actions to improve efficiency of the automated remediation. At the conclusion of the execution of the entire subset of remediation procedures, the processor slides the variable length sliding time window 210 to the subsequent alert from the alerts 150, as shown at block 255. The variable length sliding time window 210 has a default length, and for example may include the next 10, 5, 1, or any other number of alerts from the alerts 150. The processor 110 repeats the process described herein to execute the remediation procedures corresponding to the rest of the alerts.

Figure 3:
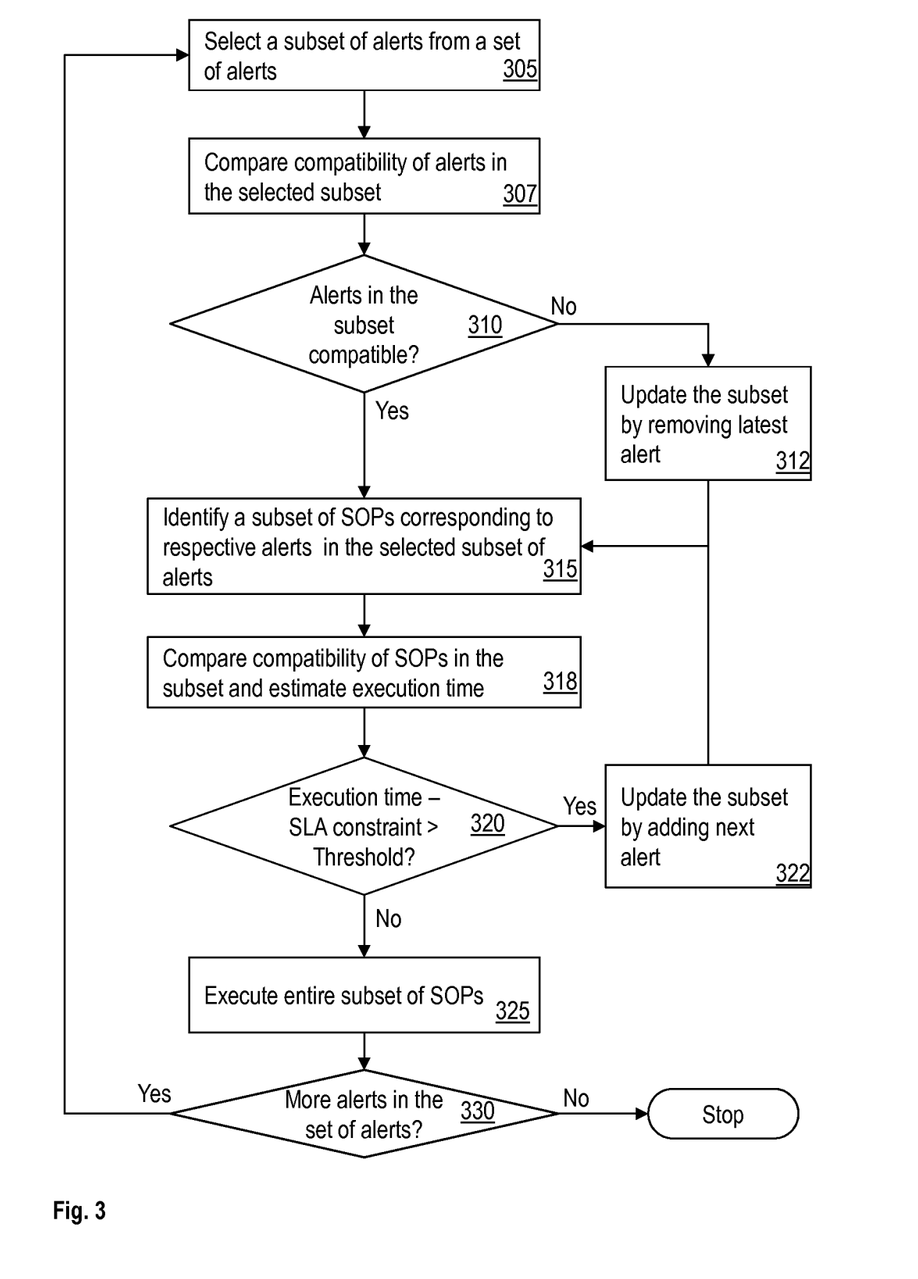
FIG. 3 illustrates a flowchart of automated alert remediation in accordance with another embodiment.

FIG. 3 illustrates a flowchart for automating an alert remediation system, such as the system 100. The processor 110 initializes a variable length sliding time window (VLSTW). The VLSTW selects a subset of a predetermined number of alerts from the multiple alerts that the AMS generates, as shown at block 305. For example, the VLSTW selects three alerts, or five alerts, or 20 alerts, or any predetermined number of alerts. In an example, the predetermined number is greater than or equal to two. The alerts that the VLSTW selects are processed in a batch. The VLSTW selects the alerts in order in which they were created. The processor 110 compares the compatibility of the alerts in the subset of alerts, as shown at block 307. For example, the processor 110 compares characteristics of the alerts to determine compatibility of the alerts in the subset. If the alerts are not compatible, the processor updates a length of the VLSTW, by reducing the length by one. By updating the length of the VLSTW, the processor 110 updates the subset of alerts by removing the latest alert that was included in the subset of alerts, as shown at blocks 310 and 312.

The processor 110 identifies a subset of remediation procedures, or SOPs mapped to each of the alerts in the selected subset of alerts, as shown at block 315. The processor 110 identifies the SOPs based on a mapping between the alerts and the SOPs. The processor determines if the SOPs in the subset of SOPs comply with constraints in an SLA. For example, the SLA may impose a constraint regarding an execution time for a batch of remediation procedures, as shown at block 318. The processor 110 compares the steps included in the respective SOPs in the subset of SOPs to identify overlap, and redundancy among the SOPs. The processor 110 estimates an execution time to execute the entire subset of SOPs. The processor 110 determines if the execution time complies with the constraint in the SLA, as shown at block 320. If the execution time is close to the SLA constraint by a predetermined threshold, the processor 110 executes the entire subset of SOPs, as shown at block 325. For example, the processor 110 determines if $\sum_{i=1}^{VSLTW\ length} \text{ExecutionTime}_i < \text{SLA}_{ResponseTime}$.

For example, the processor 110 may determine a difference between the estimated execution time and the SLA constraint and compare the difference with a predetermined threshold. Of course, in case the estimated execution time is more than the SLA constraint, the processor 110 removes the latest alert from the subset of alerts, as shown at block 312. For example, if the SLA constraint is 2 seconds, in response to the execution of the entire subset of remediation procedures estimated to take 3 seconds, the processor 110 removes the latest alert that was added to the subset of alerts. Correspondingly, the processor 110 removes, from the subset of remediation procedures, a remediation procedure of the alert that was removed. The estimated execution time of the subset of remediation procedures thus reduces, and if it is now compliant with the predetermined threshold, the processor 110 executes the entire subset of remediation procedures. Alternatively, if the estimated execution time of the entire subset of SOPs is less than the SLA constraint by more than the predetermined threshold, the processor 110 may add a next alert to the subset of alerts and thus increase the length of the VLSTW, as shown at block 322. The processor 110, at this time, continues to update the subset of SOPs by adding a SOP corresponding to the next alert and determining the compliance of the updated subset of SOPs. The processor 110 continues this process until all the alerts that the AMS generated have been responded to, as shown at block 330. If there are more alerts that have not been responded to, the processor slides the VLSTW to select the next subset of alerts. The next subset includes the predetermined number of alerts starting from the latest alert that was responded to in the previous iteration.

Thus, the automated remediation system 100 maximizes the size of sequential alerts in a batch for remediation. The VLSTW starts from a first alert to process, and is enlarged to contain as many sequential alerts as can be executed within the SLA constraint. The system additionally performs correlation analysis and SOPs compliance analysis for the selected alerts. If the alerts and SOPs are compliant, the system marks (or replaces) the SOPs to generate a consolidated subset of SOPs as a candidate for execution, and attempts enlarge the VLSTW by repeating the above process. When compliance is broken, that is the execution time is more than the SLA constraint, the system executes the entire latest candidate subset of SOPs without the latest alert that was being processed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A system for automated remediation of alerts, the system comprising:
   a communication interface configured to access a plurality of alerts generated by an application monitoring system based on monitoring one or more errors during execution of one or more computer executable applications by a computer system; and
   a processor for execution of one or more remediation procedures in response to the plurality of alerts, a remediation procedure comprising a set of computer executable operations to be executed in response to a corresponding alert, the processor being operable to:
   select a subset of alerts from the plurality of alerts according to a sliding time window, the sliding time window being assigned a first predetermined length such that the subset of alerts that is selected comprises a predetermined number of alerts;
   select a subset of remediation procedures corresponding to each alert from the subset of alerts respectively;
   determine compliance of an execution of the entire subset of remediation procedures, the compliance analysis comprising:
      determining if the execution of the one or more computer executable operations of the remediation procedures in the identified subset of remediation procedures conflict with each other, the conflict comprising a first computer executable operation being an input to a first computer executable application and a second computer executable operation being shutting down the first computer executable application; and
      determining that an estimated execution time for the execution of the one or more computer executable operations of the remediation procedures in the identified subset of remediation procedures is less than a predetermined duration;
   in response to the execution of the entire subset of remediation procedures being non-compliant, reduce the size of the sliding time window by a second predetermined length until the execution becomes compliant, which further comprises:
      remove an alert from the subset of alerts;
      remove, from the subset of remediation procedures, a remediation procedure corresponding to the alert that is removed;
      re-determine compliance of the entire execution of the entire subset of remediation procedures and reduce the sliding time window until the execution is compliant; and
      execute the entire subset of remediation procedures; and
   in response to the execution of the entire subset of remediation procedures being compliant, increase the size of the sliding time window by the second predetermined until the execution remains compliant, which further comprises:
      add another alert to the subset of alerts;
      add, to the subset of remediation procedures, another remediation procedure corresponding to the another alert;
      re-determine compliance of the entire execution of the entire subset of remediation procedures and update the sliding time window until the execution is compliant; and
      execute the entire subset of remediation procedures;
   wherein, the execution comprises merging the one or more operations of the remediation procedures in the subset, the merging comprising consolidating an overlapping operation from the one or more operations from the multiple remediation procedures by executing the overlapping operation only once.

2. The system of claim 1, wherein merging one or more remediation procedures in the subset comprises identification and elimination of overlap among the remediation procedures in the subset.

3. The system of claim 1, wherein execution of the entire subset of remediation procedures comprises determination of a sequence of execution of the remediation procedures in the subset according to dependencies among the remediation procedures in the subset.

4. The system of claim 1, wherein the alert that is removed from the subset of alerts is the alert that is temporally the most recent from among the alerts in the subset of alerts.

5. The system of claim 1, wherein the another alert that is added to the subset of alerts is temporally the earliest from among the plurality of alerts.

6. A computer program product for automated alert remediation, the computer product comprising non-transitory computer readable storage medium, the computer readable storage medium comprising computer executable instructions, wherein the computer readable storage medium comprises instructions to:
   select a subset of alerts from a plurality of alerts generated by an application monitoring system based on monitoring one or more errors during execution of one or more computer executable applications by a computer system, the selection performed according to a sliding time window, the sliding time window being assigned a first predetermined length such that the subset of alerts such that the subset of alerts that is selected comprises a predetermined number of alerts;

select a subset of remediation procedures corresponding to each alert from the subset of alerts respectively, a remediation procedure comprising a set of computer executable operations to be executed in response to a corresponding alert;

determine compliance of an execution of the entire subset of remediation procedures, the compliance analysis comprising:

determining that the execution of the one or more computer executable operations of the remediation procedures in the identified subset of remediation procedures conflict with each other, the conflict comprising a first computer executable operation being an input to a first computer executable application and a second computer executable operation being shutting down the first computer executable application; and determining that an estimated execution time for the execution of the one or more computer executable operations of the remediation procedures in the identified subset of remediation procedures is less than a predetermined duration;

in response to the execution of the entire subset of remediation procedures being non-compliant, reduce the size of the sliding time window by a second predetermined length until the execution becomes compliant, which further comprises:

remove an alert from the subset of alerts;

remove, from the subset of remediation procedures, a remediation procedure corresponding to the alert that is removed;

re-determine compliance of the entire execution of the entire subset of remediation procedures and reduce the sliding time window until the execution is compliant; and execute the entire subset of remediation procedures; and in response to the execution of the entire subset of remediation procedures being compliant, increasing the size of the sliding time window by the second predetermined length until the execution becomes compliant, which further comprises:

add another alert to the subset of alerts;

add, to the subset of remediation procedures, another remediation procedure corresponding to the another alert;

re-determine compliance of the entire execution of the entire subset of remediation procedures and update the sliding time window until the execution is compliant; and execute the entire subset of remediation procedures;

wherein, the execution comprises merging the one or more operations of the remediation procedures in the subset, the merging comprising consolidating an overlapping operation from the one or more operations from the multiple remediation procedures by executing the overlapping operation only once.

7. The computer program product of claim 6, wherein merging one or more remediation procedures in the subset comprises identification and elimination of overlap among the remediation procedures in the subset.

8. The computer program product of claim 6, wherein the alert that is removed from the subset of alerts is the alert that is temporally the most recent from among the alerts in the subset of alerts.

* * * * *